June 7, 1960   D. HODKIN   2,939,401
CONTROLLED GOVERNORS
Filed July 3, 1957   2 Sheets-Sheet 1

INVENTOR

DAVID HODKIN

June 7, 1960     D. HODKIN     2,939,401
CONTROLLED GOVERNORS

Filed July 3, 1957     2 Sheets-Sheet 2

INVENTOR
DAVID HODKIN
by
ATTORNEY

United States Patent Office 2,939,401
Patented June 7, 1960

2,939,401
CONTROLLED GOVERNORS

David Hodkin, Dunstable, England, assignor to Engineering Research and Application Limited, a British company Filed July 3, 1957, Ser. No. 669,795

Claims priority, application Great Britain July 4, 1956

2 Claims. (Cl. 103—96)

This invention relates to speed controlled governors. Centrifugal governors are well known comprising weights carried by springs which are rotated and at a predetermined speed effect a required control such as applying a brake or effecting a change of ratio in a power transmission apparatus. The main object of the present invention is to provide means of simple and reliable construction for effecting a control at one or more predetermined speeds.

According to the present invention the apparatus comprises a rotary member the speed of which is to be measured or controlled, means rotated by said member and serving to rotate a body of liquid while substantially preventing pressure flow of the liquid by such rotation and means to operate a measuring or controlling device by the pressure of such liquid. Two or more such devices may be operated by connection to said body of liquid at different positions. Said positions may be at the same or different radii according to the pressures at which said control means respond. Thus the liquid may be connected at positions of the same pressure of the latter to a plurality of said devices effective at different speeds. Alternatively or additionally the liquid may be connected at positions of different pressure to a plurality of different devices.

The invention will now be further described by way of example with reference to the accompanying drawings wherein.

Figure 1:
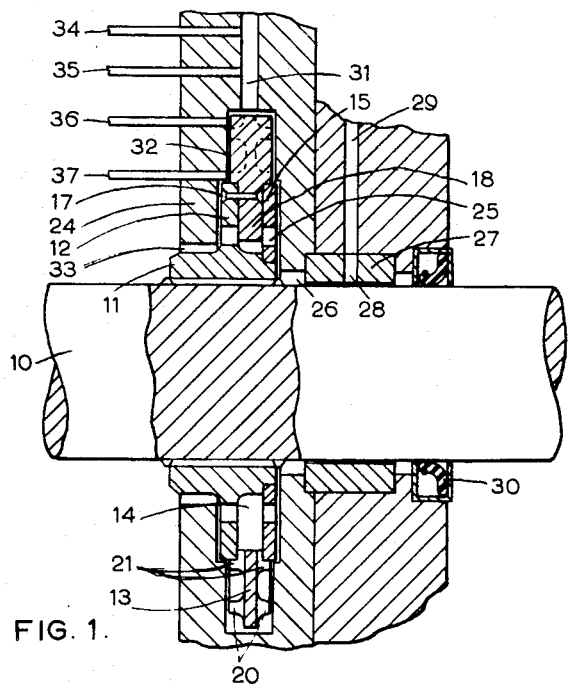
Figure 1 is a sectional view of an apparatus made in accordance with the invention.
Figure 2:
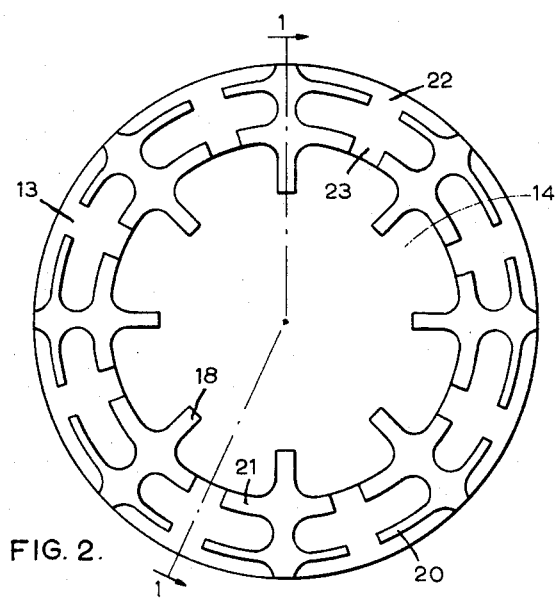
Figure 2 is an axial elevational view of a part shown in Figure 1.

Referring first to Figures 1 and 2 a motor-car gearbox shaft 10 has a hub member 11 splined thereon. This hub has an integral flange ring 12 and carries a separate similar ring 15. Between these rings is a ring-shaped rotor disc 13 having a central opening 14 enclosed by the rings 12, 15. The disc 13 is fixed to the hub ring 12 by screws or rivets 17 and the hub ring 15 is fixed to the disc 13 by similar screws or rivets (not shown). The disc carries an annular series of radial blades 18 which project into the space 14. The disc is provided on each of its opposite sides with bearing rings 20, 21 of different radii and beyond the hub rings 12, 15. Radial openings 22 are provided through the outer bearing ring and similar openings 23 are provided through the inner bearing ring, these openings 23 communicating with the interior space 14.

The rotor disc 13 is engaged in a housing or container 24 which may be a part of the gearbox housing. This housing closely engages the bearing rings to prevent any appreciable escape of liquid between the housing and rings. Holes 25 in the ring 15 permit entry of liquid from a space 26 in the housing which receives liquid from a bearing 27 which in turn is supplied by channels 28, 29 from a pump. The other side of the bearing is sealed by an oil seal 30.

The housing has a channel 31 in which the liquid is at constant pressure over its radial length for each given speed of the disc 13. The housing also has a space 32 at the sides of the rotor 13 in which the liquid is of varying pressure according to its radius. The space 32 has an outlet 33.

Figure 3:
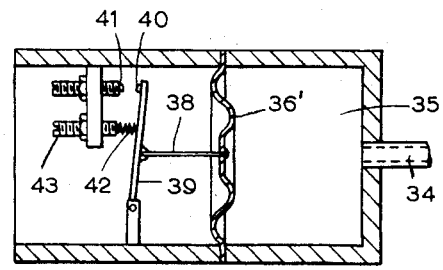
Figure 3 is a sectional view of a device for effecting control of a required part.

Pipes 34, 35 are connected to the channel 31 and pipes 36, 37 are connected to the space 32 at different radial positions. These pipes are connected to different devices to be controlled such for example as shown in Figure 3 in which the pipe 34 is shown connected to a chamber 35 one end of which is closed by a flexible wall 36' which is connected by pin 38 to a lever 39 which carries an electric contact 40 engageable with a contact 41. The contacts 40, 41 are connected in an electric circuit which controls the changing of gear ratios. The diaphragm is loaded by a spring 42 the pressure of which is adjustable by screw 43.

The annular bearing rings through which the slots 22, 23 pass prevent eddy currents building up due to the lower angular velocity of the fluid near the stationary wall of the container.

The pressure generated at a given measuring point is proportional to the square of the rotational speed of the rotor, proportional to the square of the radius at which the measuring point is situated and is directly proportional to the density of the liquid. The great advantage of this form of hydraulic governor is that it is substantially insensitive to changes of viscosity, and therefore to changes in the running temperature. The relationship between the operating pressure of the pressure sensitive switches and the speed of the rotor can be deduced from the above relationships.

The varying pressures may also be utilised to operate a revolution counter.

Furthermore if desired the varying pressure may be caused to operate a clutch so that the clutch is engaged at a predetermined engine speed and effects declutching when the engine speed falls below that speed.

Figure 4:
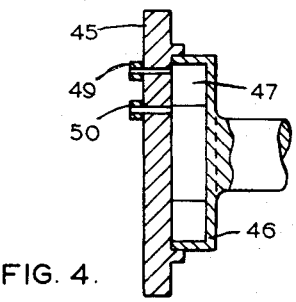
Figures 4 and 5 are sectional views of modified forms of the apparatus.
Figure 5:
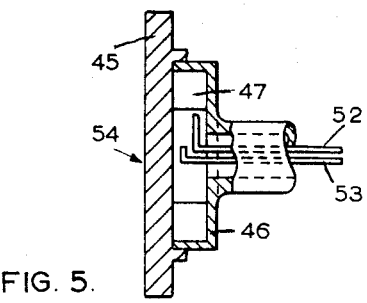

In the constructional form of the invention shown in Figure 4 the housing has a non-rotary side plate 45 which serves as a bearing for a rotary container 46. The latter is provided with blades 47 which cause the liquid to rotate with the container. The side plate has nipple connections 49, 50 at different radii leading to different pressure responsive control devices, e.g. diaphragm devices as shown in Figure 3. Alternatively as shown in Figure 5 the connections may be made through the hub of the container by stationary pipes 52, 53 that have their open ends in the container at the required radius or radii.

I claim:

1. In an apparatus for measuring or controlling the speed of a rotary member, a rotor disc rotated by said member, blades on said disc serving to rotate a body of liquid, a stationary housing in which said rotor disc is located, said housing having an inlet opening and an outlet opening therein both leading into said housing, a plurality of flange means on said disc spaced inwardly from the periphery of the rotor disc and projecting from the rotor disc in the axial direction and projecting from the blades in the circumferential direction and serving for suppressing eddy currents and reducing pressure flow of liquid caused by rotation of the liquid said flanges being spaced apart from each other circumferentially to provide openings through the flanges; said stationary housing closely engaging the flange means on both sides except for the inlet opening on one side, and the outlet opening spaced radially from said member.

2. In an apparatus for measuring or controlling the speed of a rotary member, a rotor disc rotated by said member, blades on said disc serving to rotate a body of liquid, a stationary housing in which said rotor disc is located, said housing having an inlet opening and an outlet opening therein both leading into said housing, flanges on said disc spaced inwardly from the periphery of the rotor disc and projecting from the rotor disc in the axial direction and projecting from the blades in the circumferential direction for suppressing eddy currents and reducing pressure flow of liquid caused by its rotation and said flanges being spaced apart from each other circumferentially to provide openings through the flanges; said stationary housing closely engaging the flange means on both sides except for the inlet opening on one side, and the outlet opening spaced radially from said member; said blades and flanges including at least two sets of flanges at different radii on both sides of each blade on each side of the disc.

References Cited in the file of this patent

UNITED STATES PATENTS

| 1,142,726 | Phillips | June 8, 1915 |
| 2,015,200 | Spoor | Sept. 24, 1935 |
| 2,321,934 | Pato | June 15, 1943 |
| 2,419,924 | Wahle | Apr. 29, 1947 |
| 2,673,604 | Lawrence | Mar. 30, 1954 |
| 2,690,712 | Foote | Oct. 5, 1954 |
| 2,746,240 | Brown et al. | May 22, 1956 |

FOREIGN PATENTS

| 139,113 | Sweden | Apr. 14, 1953 |
| 187,684 | Great Britain | Oct. 19, 1922 |
| 217,559 | Great Britain | Jan. 15, 1925 |